March 5, 1968  EIJI FURUKAWA  3,371,620
APPARATUS FOR DISPLACING A CAR
Filed Dec. 13, 1965
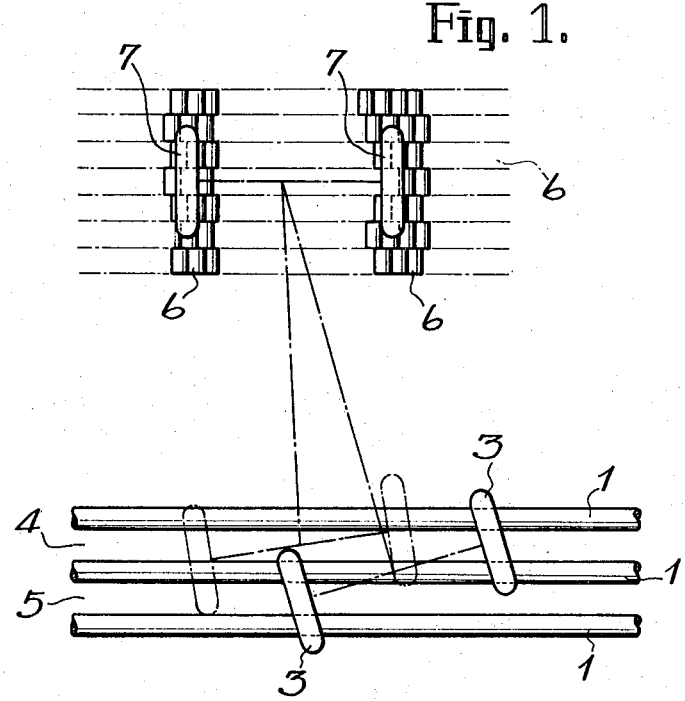
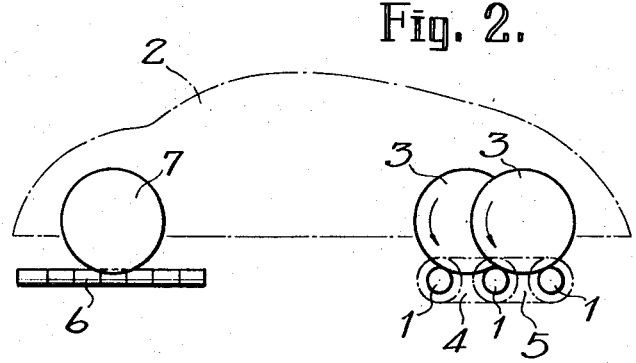
INVENTOR.
EIJI FURUKAWA
BY
*Linton and Linton*
ATTORNEYS

United States Patent Office 3,371,620
Patented Mar. 5, 1968

3,371,620
APPARATUS FOR DISPLACING A CAR
Eiji Furukawa, Chiba-shi, Japan, assignor to Daido Yusoki Kabushiki Kaisha, Tokyo, Japan, and Hitachi Zosen Kabushiki Kaisha, Osaka, Japan, both corporations of Japan
Filed Dec. 13, 1965, Ser. No. 513,294
Claims priority, application Japan, Dec. 17, 1964, 39/71,522
2 Claims. (Cl. 104—35)

The present invention is concerned with means for displacing a vehicle and has as an object the provision of means for docking many vehicles within a relatively limited area.

In describing this specification, I will make frequent use of the expression "vehicle." It is to be understood that this term "vehicle" represents such vehicles as have at least three wheels, two of which are at one end of the vehicle and the third wheel being at its opposite end.

Briefly stated in accordance with one aspect of this invention, there is provided a means for displacing a vehicle of the class described, comprising at least two rotatable rollers arranged parallel with each other and at least a means for freely displacing a load placed thereon in the direction of the axes of said rollers by placing at least one vehicle wheel on said two rollers in such a manner that the shaft of the last-named wheel is not arranged in parallel with the axes of said rollers and, placing the remaining wheels on said displacing means in such a manner that the shaft of said remaining wheels is not arranged in parallel with the axes of said rollers, and rotating said rollers on their axes.

By rotating the rollers as above, the vehicle is displaced in the direction of the axes of said rollers. The rollers may be driven by the vehicle wheel placed thereon when the wheel is the driving wheel. When the vehicle is an ordinary automobile, the two rear wheels may be placed on three rollers and the three rollers may be driven by the two rear wheels. In case of a front wheel driving four-wheeled vehicle, generally the front driving wheels are the steering wheels and, therefore, it is possible to place the two front driving wheels on two rollers and drive them by the wheels. It is not necessary to restrict the means for freely displacing a load placed thereon to a specified form.

The invention will be better understood and other objects and additional advantages of the invention will become apparent upon perusal of the following description taken in connection with the drawings, in which:

FIG. 1 is a plan view of an automobile being displaced by the means embodying this invention; and
FIG. 2 is a side elevation thereof.

Referring more particularly to the drawings, the preferred embodiment of this invention will now be described; however, this description will be understood to be illustrative of the invention and not as limiting it to the particular provision shown and described. There are arranged three rollers 1 on the supporting surface of a floor of an area for parking automobiles. It is preferred that these rollers 1 are half embedded in the floor. It is necessary that these rollers 1 are arranged in parallel with one another and spaced apart at a distance of about the radius of the rear wheel of the predetermined automobile to be displaced. In this case, because the rear wheels 3 of the automobile are placed on the rollers 1, it is not necessary to drive the rollers 1 separately. Accordingly, it is enough to mount the rollers 1 for free rotation.

There is also a means for freely displacing a load placed thereon, comprising a plurality of small rollers 6. Each roller 6 is arranged freely rotatable on an axis arranged at a right angle to the axes of the rollers 1 so that the load placed thereon is to be displaced in the direction of the axes of the rollers 1. It is preferred to arrange the small rollers 6 as dense as possible and with such row of these small rollers 6 arranged offset to the adjacent rows. Rollers 6 are spaced from rollers 1 so that when the rear wheels 3 of the automobile are placed on the rollers 1, the front wheels 7 are placed on the roller spreading 6, so that the area for providing such a roller spreading 6 may be predetermined. It is not necessary to extend the spread of rollers 6 very far in the direction of the axes of the small rollers 6 but it is necessary to extend the same as long as the length of the rollers 1.

In the use of the present invention an automobile is driven onto the rollers by its own power slowly and carefully at an angle to the direction of the axes of the rollers 1 and the front wheels 7 are placed on the roller spreading 6 in such a manner that the axes of the front wheels 7 are arranged at a right angle to the axes of the small rollers 6 and, at the same time, the right rear wheel 3 and the left rear wheel 3 are placed on the first and second rollers 1 and on the second and third rollers 1, respectively, in such a manner that the axes of the rear wheels 3 are arranged at an angle to the axes of the rollers 1. The angle is to be predetermined relatively to the tread of the rear wheels 3 and the interval between two adjacent rollers 1.

When the automobile has been placed as above, the rear wheels 3 are driven by its own power. Since the two rear wheels 3 are placed on the rotatable rollers 1, the automobile is not advanced but the rollers are driven. Since the rollers 1 are not displaceable in the direction of the axes, the rear wheels 3 are displaced leftwards in FIG. 1. The front wheels 7 are easily displaceable in the above direction by virtue of the roller spreading 6 so that the whole automobile is displaced leftwards.

It is possible to drive the rollers 1 otherwise. When at least a roller 1 is driven by, for example, an electric motor (not shown) at a suitable speed, the automobile placed on the rollers as above may be displaced without the driving power of the car.

Also, when the automobile is driven onto the rollers 1 and 6, it is necessary to brake the rollers 1.

While a particular embodiment of the invention has been illustrated and described, modifications thereof will readily occur to those skilled in the art. It should be understood therefore that the invention is not limited to the particular provision and procedure disclosed but that the appended claims are intended to cover all modifications which do not depart from the true spirit and scope of the invention.

What is claimed as new and desired to be secured by Letters Patent of the United States is:

1. Means for the lateral displacement of a car having a pair of driving wheels at one end and at least one additional wheel at the opposite end of said car comprising three parallel rotatably mounted rollers secured to a horizontal supporting surface and spaced apart a fixed distance and including two outer rollers and an intermediate roller, the spacing of each said outer roller from said intermediate roller being less than the diameter of said driving wheels and sufficiently close together to maintain the lowermost portion of each driving wheel, when disposed on a corresponding pair of rollers, spaced from said supporting surface, one of said outer and intermediate rollers supporting one of said car driving wheels and the other of said outer and said intermediate rollers supporting the other of said car driving wheels, said car driving wheels, when driven, rotate said three rollers, and a plurality of relatively small rotatably mounted rollers in said supporting surface positioned for supporting said additional wheel with the axis of said small rollers extending laterally of the axis of said additional wheel, and to the axes of said three parallel rollers, the spacing between adjacent ones of said small rollers, in a direction normal to the axes of said last mentioned rollers, being less than the width of the said additional wheel, and the length of the supporting surface in which said small rollers are mounted being substantially coextensive with the length of the supporting surface in which said first named rollers are mounted when measured in the direction of the axes of said first mentioned rollers.

2. Means for the lateral displacement of a car having a pair of driving wheels at one end and at least one additional wheel at the opposite end of said car comprising three parallel rotatably mounted rollers secured to a horizontal supporting surface and spaced apart a fixed distance and including two outer rollers and an intermediate roller, the spacing of each said outer roller from said intermediate roller being less than the diameter of said driving wheels and sufficiently close together to maintain the lowermost portion of each driving wheel, when disposed on a corresponding pair of rollers, spaced from said supporting surface, one of said outer and intermediate rollers supporting one of said car driving wheels and the other of said outer and said intermediate rollers supporting the other of said car driving wheels, means for rotating said three rollers together in the same direction, and a plurality of relatively small rotatably mounted rollers in said supporting surface positioned for supporting said additional wheel with the axis of said small rollers extending laterally of the axis of said additional wheel, and to the axes of said three parallel rollers, the spacing between adjacent ones of said small rollers, in a direction normal to the axes of said last mentioned rollers, being less than the width of the said additional wheel, and the length of the supporting surface in which said small rollers are mounted being substantially coextensive with the length of the supporting surface in which said first named rollers are mounted when measured in the direction of the axes of said first mentioned rollers.

References Cited
UNITED STATES PATENTS

| | | | |
|---|---|---|---|
| 1,373,790 | 4/1921 | Becker | 180—1 |
| 2,180,127 | 11/1939 | Solomon | 214—16.1 |
| 2,597,930 | 5/1952 | Grosvenor | 214—339 X |
| 2,705,570 | 4/1955 | Maissian | 214—16.1 |
| 3,058,565 | 10/1962 | Byrnes | 193—36 |
| 3,194,376 | 7/1965 | Holben | 193—36 |

A. HARRY LEVY, *Primary Examiner.*